(12) United States Patent
Lang et al.

(10) Patent No.: US 11,845,615 B1
(45) Date of Patent: Dec. 19, 2023

(54) POLISHING DEVICE FOR METAL CONVEYOR BELT SUITABLE FOR AUTOMATIC CONVEYOR LINE

(71) Applicant: ZHEJIANG UNIVERSITY OF SCIENCE & TECHNOLOGY, Hangzhou (CN)

(72) Inventors: Tingting Lang, Hangzhou (CN); Fanghao Li, Hangzhou (CN); Xinrong Jin, Hangzhou (CN); Junhao Ye, Hangzhou (CN)

(73) Assignee: ZHEJIANG UNIVERSITY OF SCIENCE & TECHNOLOGY, Hangzhou (CN)

( * ) Notice: Subject to any disclaimer, the term of this patent is extended or adjusted under 35 U.S.C. 154(b) by 0 days.

(21) Appl. No.: 18/335,399

(22) Filed: Jun. 15, 2023

(30) Foreign Application Priority Data

May 12, 2023 (CN) .......................... 202310535936.3

(51) Int. Cl.
*B65G 45/10* (2006.01)
*B65G 15/48* (2006.01)
(52) U.S. Cl.
CPC ............. *B65G 45/10* (2013.01); *B65G 15/48* (2013.01)
(58) Field of Classification Search
None
See application file for complete search history.

(56) References Cited

U.S. PATENT DOCUMENTS

| | | | | |
|---|---|---|---|---|
| 3,583,555 A * | 6/1971 | Karsnak | ................. | B65G 45/20 15/256.5 |
| 5,924,154 A * | 7/1999 | Gockel | .................... | B08B 1/04 15/21.1 |
| 6,367,613 B1 * | 4/2002 | Montgomery | ......... | B65G 45/22 198/495 |
| 6,978,880 B2 * | 12/2005 | Barrett | .................. | B65G 23/06 198/495 |
| 9,022,206 B2 * | 5/2015 | Schenck | ................ | B65G 45/10 198/494 |
| 9,850,072 B2 * | 12/2017 | Lucchi | .................. | B65G 23/06 |

* cited by examiner

*Primary Examiner* — Kavel Singh
(74) *Attorney, Agent, or Firm* — Rachel K. Pilloff; Sean A. Passino; Pilloff Passino & Cosenza LLP

(57) ABSTRACT

A polishing device for a metal conveyor belt suitable for an automatic conveyor line includes a holding pillar with one end fixedly provided with a bearing head, a supporting carriage fixedly connected to the bearing head, assembly supporting frames, an assembly sliding column, a polishing supporting shaft and locking mechanism. A bottom end of the holding pillar is provided with a barrier protection assembly. Both ends of the supporting carriage are respectively provided with a reciprocating assembly and two assembly supporting frames. Opposite side surfaces of the two assembly supporting frames are respectively rotatably connected with a rotating seats. Both ends of the assembly sliding column are respectively fixedly installed and in transmission connection with two rotating seats. Both ends of the assembly sliding column are respectively in transmission connection with the reciprocating assembly. The polishing supporting shaft is in transmission connection with the assembly sliding column.

10 Claims, 10 Drawing Sheets

POLISHING DEVICE FOR METAL CONVEYOR BELT SUITABLE FOR AUTOMATIC CONVEYOR LINE

CROSS-REFERENCE TO RELATED APPLICATIONS

This application claims priority to Chinese Patent Application No. 202310535936.3, filed on May 12, 2023, the contents of which are hereby incorporated by reference.

TECHNICAL FIELD

The application belongs to the technical field of grinding and polishing, and in particular to a polishing device for a metal conveyor belt suitable for an automatic conveyor line.

BACKGROUND

Compared with conveyor belts made of other materials, metal conveyor belts have many performance characteristics, such as high-temperature resistance, strong load-bearing, fracture resistance, wear resistance, etc., so they are widely used in a variety of transportation scenarios. In particular, conveyor belts made of pure metal or metal alloy materials have been widely used in the field of automatic conveyor lines. However, after a long period of use, the metal conveyor belt is also be oxidized or rusted, especially in high temperature and high humidity environment, and the oxidation speed of the metal conveyor belt is faster. If the metal conveyor belt is not treated in time, it will lead to accidents such as breakage, so it is necessary to maintain and polish the metal conveyor belt regularly.

At present, the metal conveyor belt is still mostly polished by workers holding sandpaper to scrape and polish the oxidized parts back and forth, but this kind of hand-held sandpaper polishing is not only inefficient, but also labor-intensive because it relies on manual pushing and pressing, and it is only suitable for small-area local polishing. If large-area parts are polished manually, it will lead to more labor waste. However, a small number of fixed polishing machines are inconvenient to move and use because they are difficult to match with the metal conveyor belts of different specifications.

Therefore, it is urgent to design a polishing device for a metal conveyor belt suitable for an automatic conveyor line to solve the above technical problems.

SUMMARY

In order to solve the above technical problems, the application provides a polishing device for a metal conveyor belt suitable for an automatic conveyor line, which can automatically lock sandpaper, adjust the polishing angle and direction, and greatly improves the polishing efficiency for the metal conveyor belt.

In order to achieve the above objectives, the present application provides a polishing device for a metal conveyor belt suitable for an automatic conveyor line. The polishing device for the metal conveyor belt suitable for the automatic conveyor line includes:

a holding pillar, where one end of the holding pillar is fixedly installed with a bearing head; the bottom end of the holding pillar is provided with a barrier protection assembly;
a supporting carriage where the supporting carriage is fixedly connected to the bearing head, and both ends of the supporting carriage are fixedly connected with symmetrically arranged sliding struts; the both ends of the supporting carriage are respectively provided with a reciprocating assembly;
assembly supporting frames, where the two assembly supporting frames are symmetrically and fixedly installed at the both ends of the supporting carriage and the opposite side surfaces of the two assembly supporting frames are respectively rotatably connected with the rotating seats;
an assembly sliding column, where the both ends of the assembly sliding column are respectively fixedly installed and in transmission connection with the two rotating eats; both ends of the assembly sliding column are respectively in transmission connection with the reciprocating assembly;
The polishing supporting shaft, the polishing supporting shaft is in transmission connection with the assembly sliding column, the polishing supporting shaft is provided with a locking mechanism for loading sandpaper, and the sandpaper is attached to the outer wall of the polishing supporting shaft around.

Optionally, the locking mechanism includes a locking bearing groove penetrating through the outer wall of the polishing supporting shaft, and clamping grooves are respectively arranged at the upper and lower ends of the locking bearing groove. A positioning pillar is fixedly installed in one of the clamping grooves, a locking assembly is arranged on the positioning pillar. The locking assembly is detachably connected with the other one of the clamping grooves, one end of the sandpaper is clamped between the one of the clamping grooves and the positioning pillar, and the other end of sandpaper is clamped between the locking assembly and the other one of the clamping grooves.

Optionally, the locking assembly includes a threaded supporting shaft rotatably connected in the locking bearing groove, and a plurality of threaded sleeving blocks are threadedly connected on the threaded supporting shaft. The side walls of the threaded sleeving blocks corresponding to the positioning pillar are hinged with a supporting bottom column, and the supporting bottom column is hinged with the positioning pillar. The other ends of a plurality of threaded sleeving blocks are in transmission connection with locking struts, and the locking struts are detachably connected with the clamping grooves, and sandpaper is clamped between the locking struts and the clamping grooves.

Optionally, the both ends of the assembly sliding column are respectively fixedly connected with a limit supports, and the limit supports is in transmission connection with the rotating seats. A supporting sleeve is rotatably sleeved on the assembly sliding column, and the supporting sleeve is in transmission connection with the reciprocating assembly. The end face of the supporting sleeve away from the limit supports is fixedly connected with a rotating clamping block, and the end face of the polishing supporting shaft is provided with a rotating clamping groove adapted to the rotating clamping block, and the rotating clamping block is inserted into the rotating clamping groove.

Optionally, the side wall of the assembly sliding column is fixedly connected with a limit side block, the bottom end of the rotating clamping groove is provided with an assembly sleeving groove. The assembly sleeving groove is matched with the limit side block, and the limit side block is inserted into the assembly sleeving groove.

Optionally, the reciprocating assembly includes a reciprocating motor fixedly installed in the supporting carriage, and the output shaft of the reciprocating motor is in transmission connection with a tooth-uncompleted gear, and the tooth-uncompleted gear is in transmission connection with a positioning tooth block fixedly installed on the side wall of the supporting sleeve, and the positioning tooth block is sleeved on each of the sliding struts in a sliding way. The outside of assembly sliding column is sleeved with a positioning spring, and both ends of the positioning spring are respectively fixedly connected with the limit supporting carriage and the supporting sleeve.

Optionally, a driving motor is fixedly installed in each of the assembly supporting frames, and the output end of the driving motor is in transmission connection with a driving gear, and the driving gear is in transmission connection with the transmission gear sleeved and fixedly connected outside the rotating seats. The side wall of the each of the assembly supporting frames is provided with a rotating groove, and the outer wall of the rotating seats provided with a preset groove adapted to the rotating groove, and the preset groove is clamped in the rotating groove and rotatably connected with the rotating groove.

Optionally, the barrier protection assembly includes a positioning supporting block fixedly connected to one end of the holding pillar facing the supporting carriage and both ends of the positioning supporting block are respectively rotatably connected with a rotating bearing column, and a bearing partition frame is fixedly connected to the rotating bearing column. The bearing partition frame is detachably connected with the mounting support frame fixedly installed on both sides of the holding pillar.

Optionally, two sides of the mounting support frames are respectively fixedly connected with a bearing frame, and a driving battery for supplying power to the polishing device for the metal conveyor belt suitable for the automatic conveyor line is fixedly installed in the bearing frame.

Optionally, the rotating seats is provided with threaded grooves. The threaded grooves are arranged corresponding to the locking holes on the limit supports and bolts are installed between the threaded grooves and the locking holes in a threaded way.

Compared with the prior art, the application has the following advantages and technical effects. The polishing device for the metal conveyor belt suitable for an automatic conveyor line provided by the application is mainly used for polishing the rust and stains on the surface of the metal conveyor belt. When in use, the pre-prepared sandpaper is wound and attached to the polishing supporting shaft, and then the sandpaper is locked and fixed by the locking mechanism on the polishing supporting shaft, so that the sandpaper is firmly attached and fixed on the polishing supporting shaft for polishing the metal conveyor belt. The sandpaper is convenient to install and replace, and saves time and labor. The rotating seats rotatably connected to the assembly supporting frames drives the polishing supporting shaft wrapped with sandpaper to rotate through the assembly sliding column, so that the sandpaper rubs the surface of the metal conveyor belt, thereby polishing the metal conveyor belt, realizing polishing of the metal conveyor belt, greatly reducing the labor intensity and improving the polishing efficiency. The reciprocating assembly on the supporting carriage drives the assembly sliding column to oscillate in a reciprocating manner, and the rotating polishing supporting shaft is pushed and pulled in a reciprocating manner transversely, so that the polishing supporting shaft is able to synchronously perform reciprocating rubbing to a certain extent when cooperating with sandpaper to perform rotating polishing, further improving the efficiency and effect of polishing the device, and reducing the damage to the metal conveyor belt caused by excessive polishing. The barrier protection assembly arranged on the holding pillar is able to cover the working parts which are not running, and bear and protect the parts for grinding and polishing, thus reducing the damage caused by bumping and further improving the service life of the device.

The application is capable of automatically locking the sandpaper and adjusting the polishing angle and direction, thus greatly improving the polishing efficiency of the metal conveyor belt.

BRIEF DESCRIPTION OF THE DRAWINGS

The accompanying drawings, which constitute a part of this application, are used to provide a further understanding of this application. The illustrative embodiments of this application and their descriptions are used to explain this application, and do not constitute an improper limitation of this application.

DETAILED DESCRIPTION OF THE EMBODIMENTS

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative labor belong to the scope of protection of the present application.

In order to make the above objects, features and advantages of the present application more obvious and easier to understand, the present application will be further described in detail with the attached drawings and specific embodiments.

Figure 1:
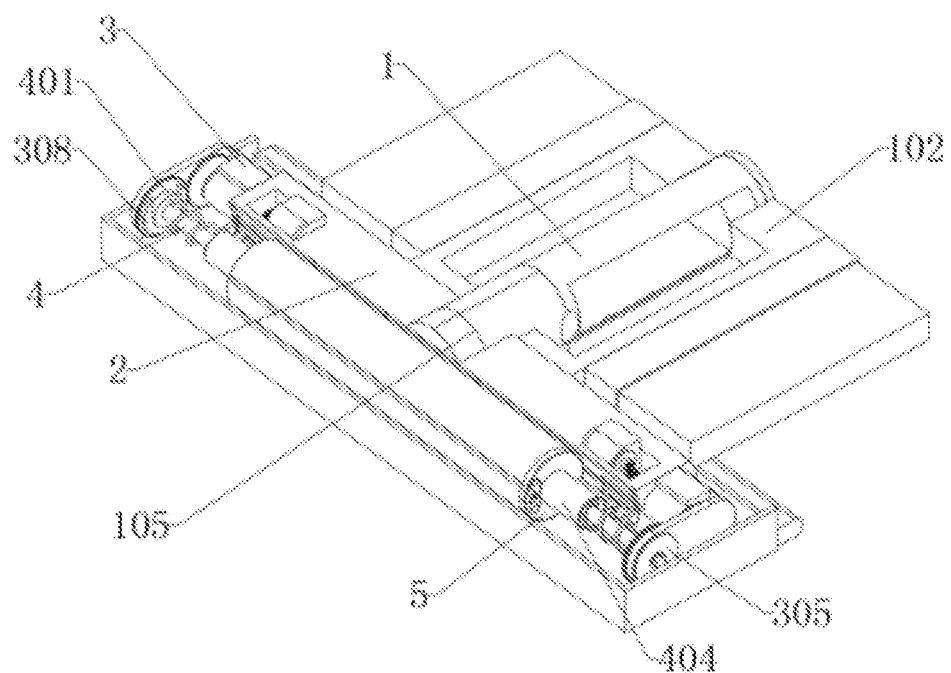
FIG. 1 is a front view of a folded state of a metal conveying belt polishing device suitable for an automatic conveyor line of the present application.
Figure 2:
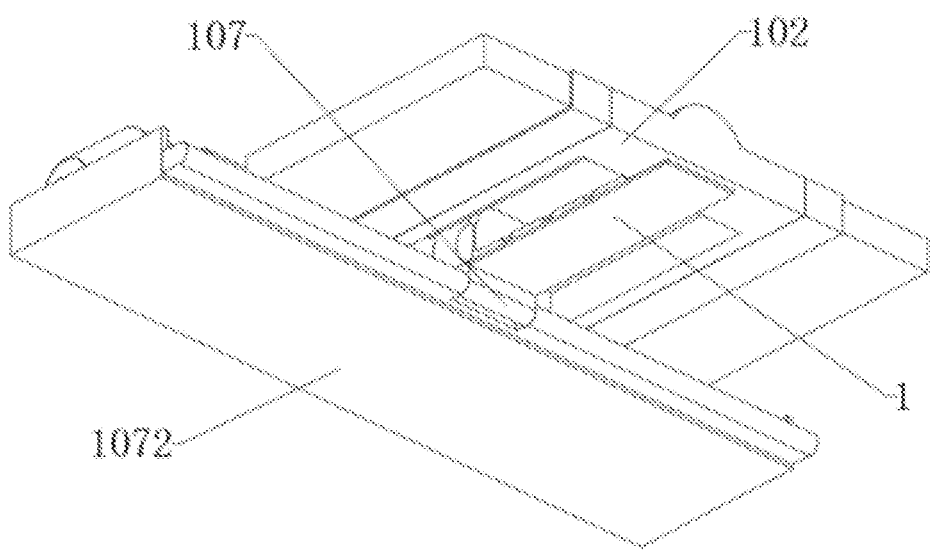
FIG. 2 is a bottom view of a folded state of a metal conveying belt polishing device suitable for an automatic conveyor line of the present application.
Figure 3:
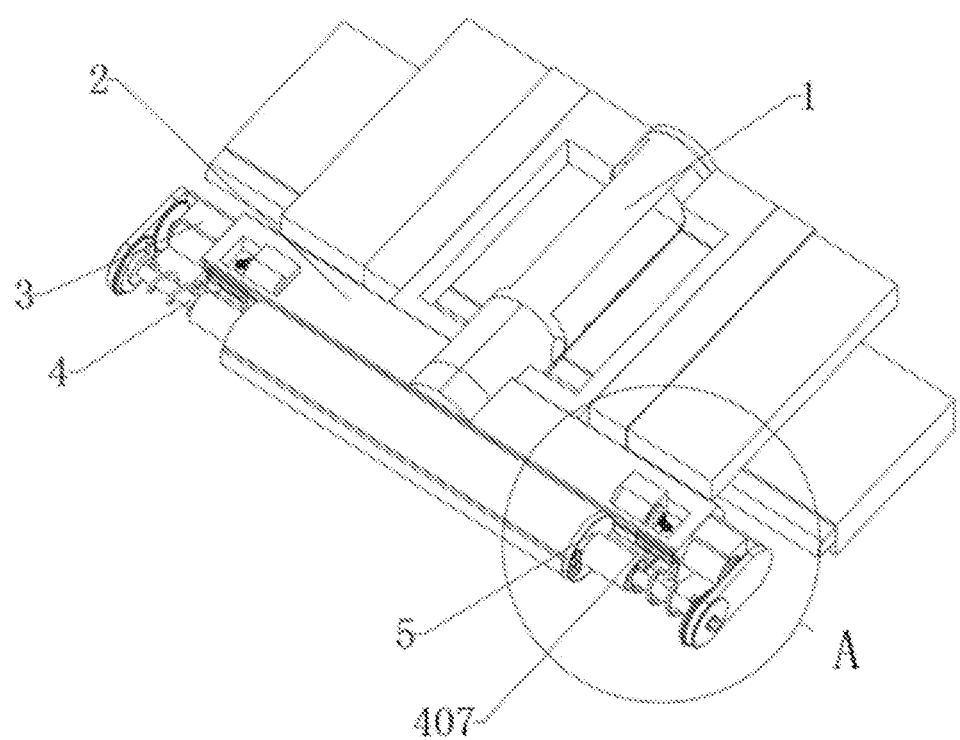
FIG. 3 is a front view of an unfolded state of a metal conveying belt polishing device suitable for an automatic conveyor line of the present application.
Figure 4:
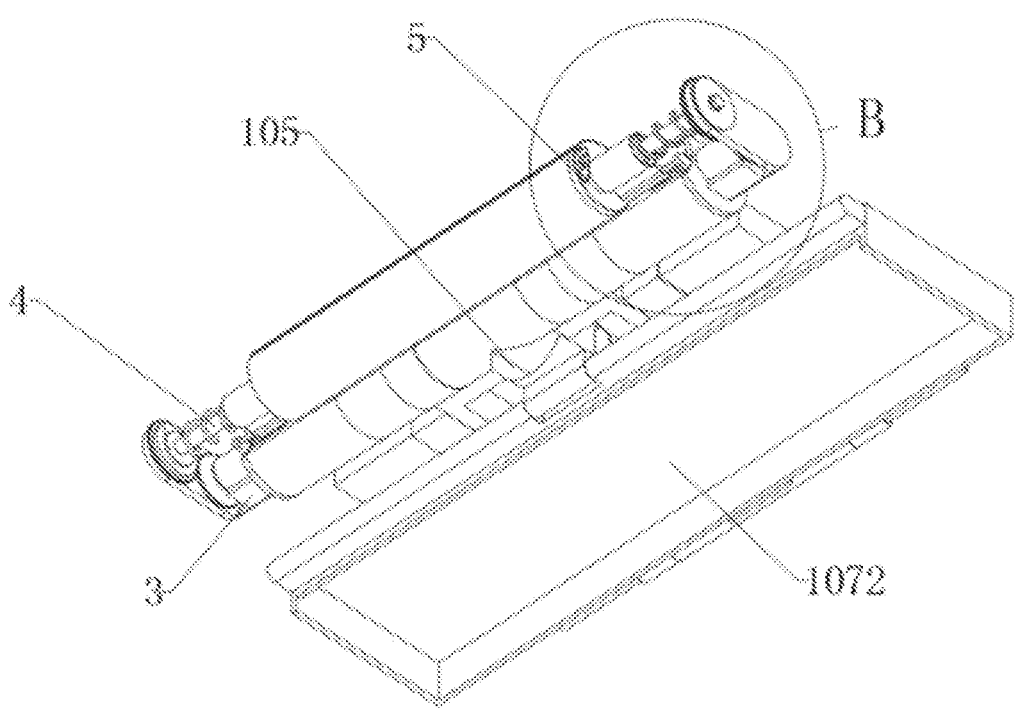
FIG. 4 is a bottom view of an unfolded state of a metal conveying belt polishing device suitable for an automatic conveyor line of the present application.
Figure 5:
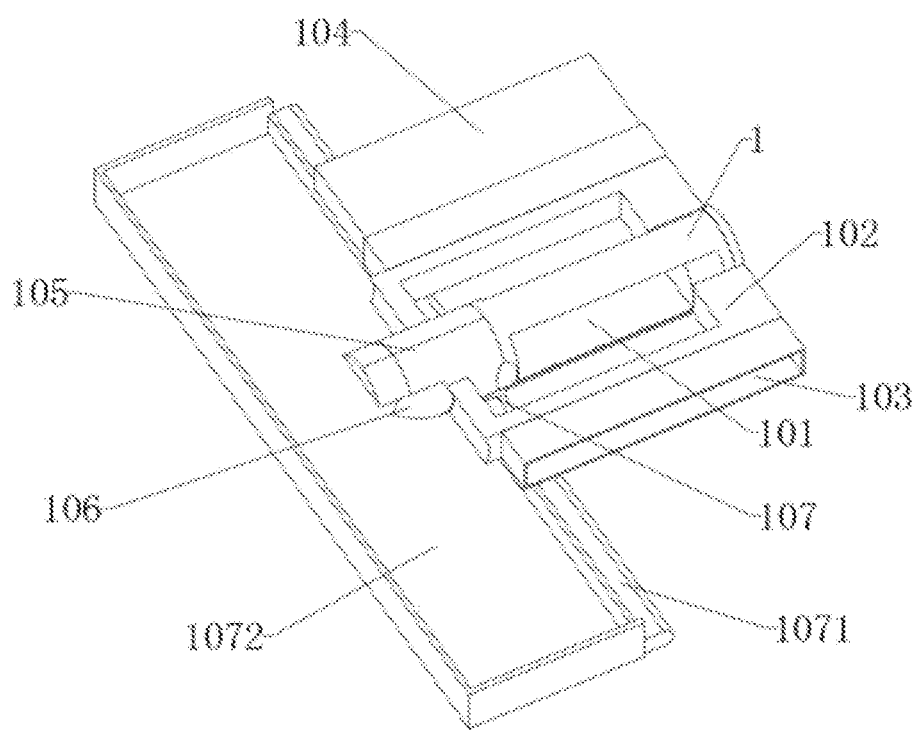
FIG. 5 is a schematic diagram of an assembly structure of a holding pillar of the present application.
Figure 6:
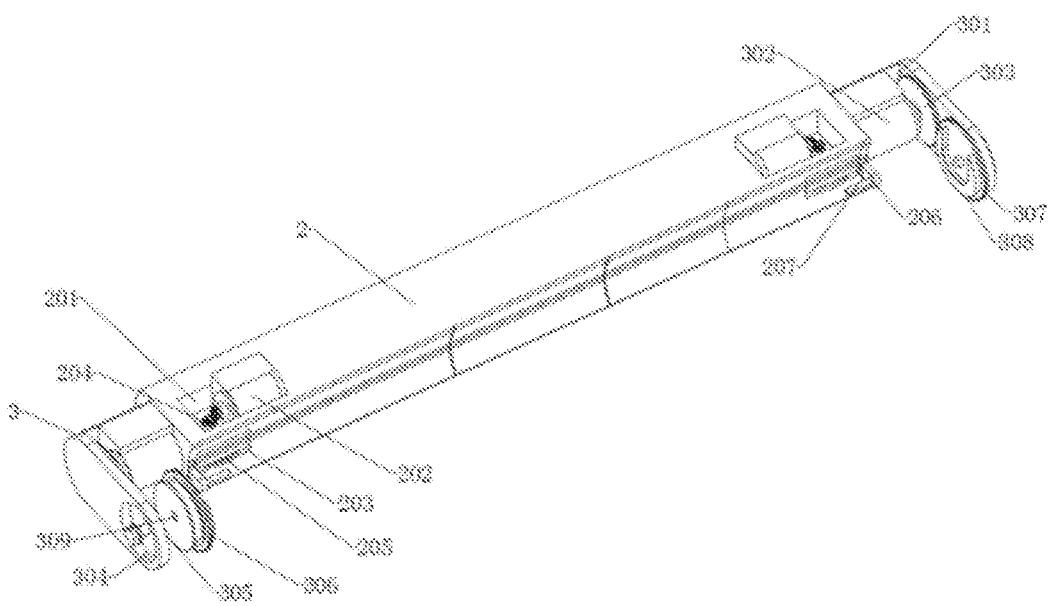
FIG. 6 is a schematic diagram of an assembly structure of a supporting carriage according to the present application.
Figure 7:
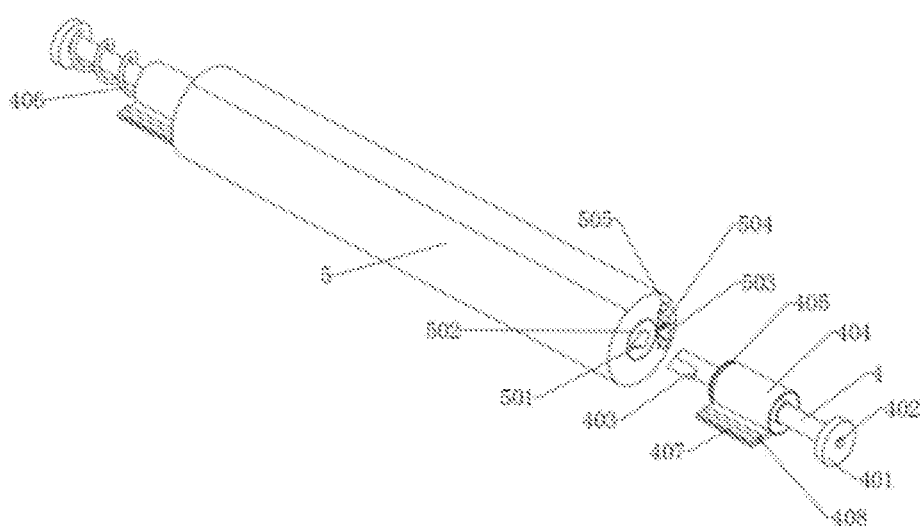
FIG. 7 is a schematic diagram of an assembly structure of an assembly sliding column of the present application.
Figure 8:
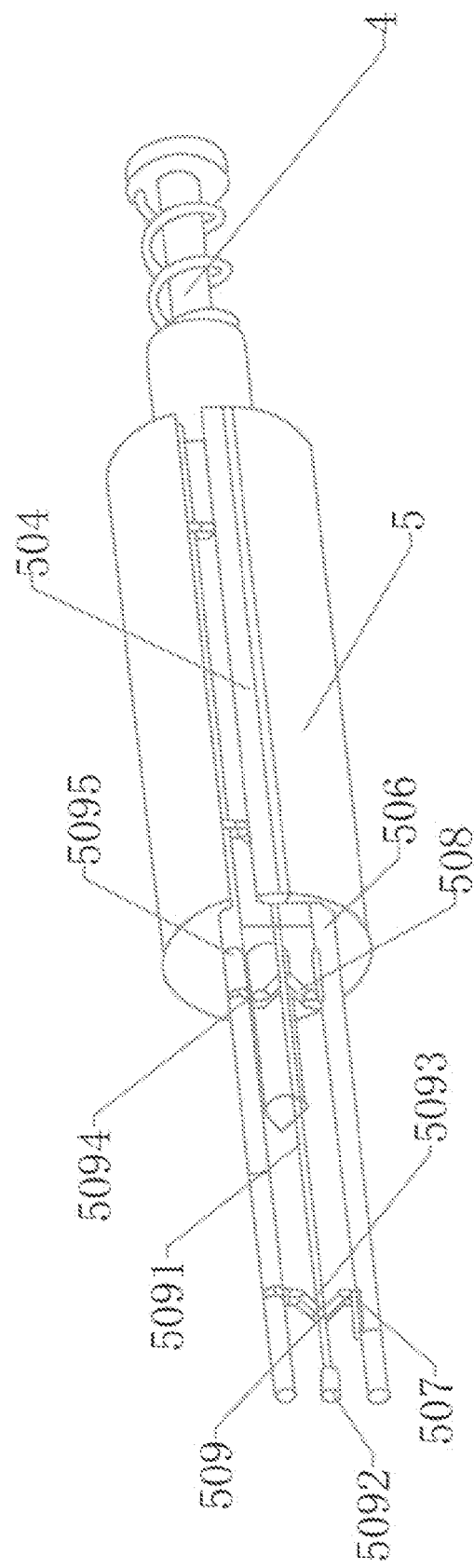
FIG. 8 is a schematic view of an assembly structure of a polishing supporting shaft of the present application.
Figure 9:
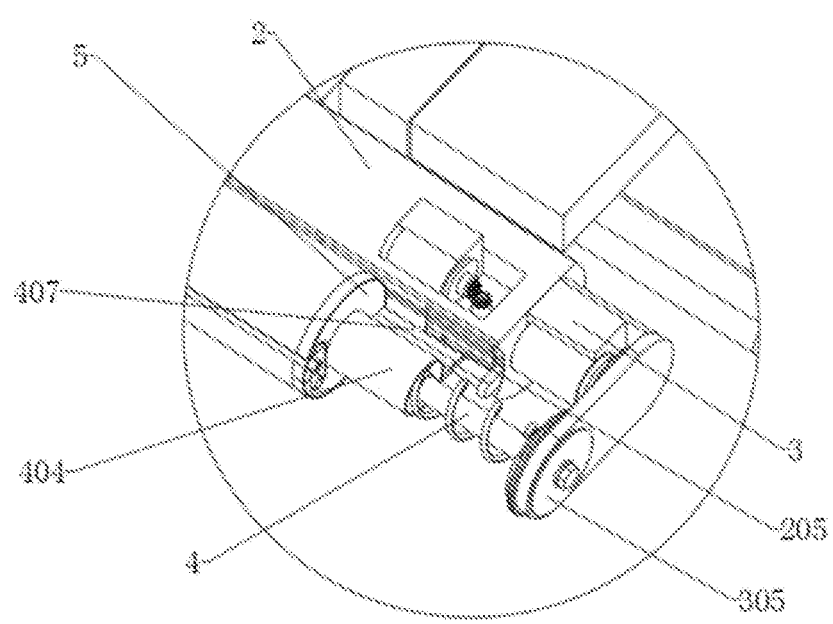
FIG. 9 is an enlarged structural schematic diagram at A in FIG. 3.
Figure 10:
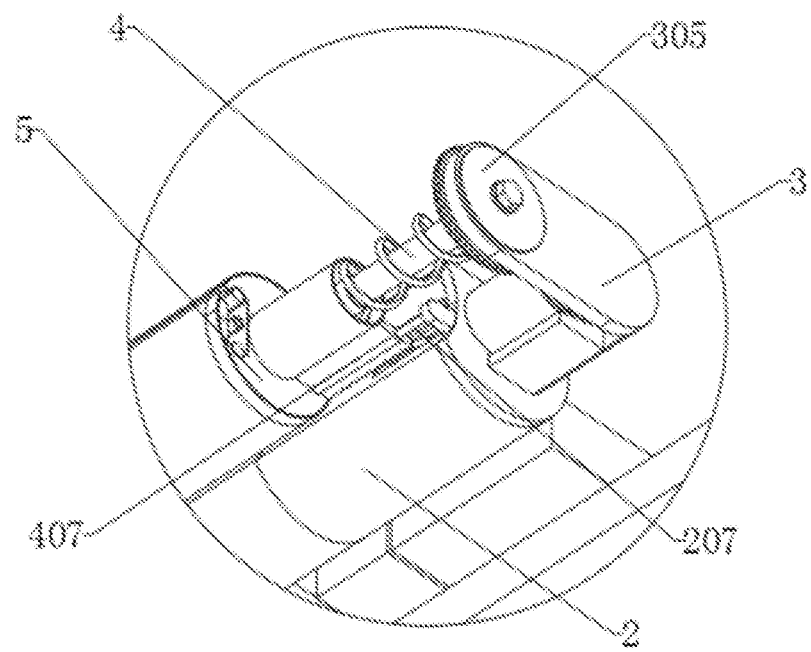
FIG. 10 is an enlarged structural schematic diagram at B of FIG. 4 according to the present application.

Referring to FIG. 1-FIG. 10, this embodiment provides a polishing device for a metal conveyor belt suitable for an automatic conveyor line, including:

a holding pillar 1, where one end of the holding pillar 1 is fixedly provided with a bearing head 105; the bottom end of the holding pillar 1 is provided with a barrier protection assembly;

a supporting carriage 2, where the supporting carriage 2 is fixedly connected to the bearing head 105, and the both ends of the supporting carriage 2 are fixedly connected with symmetrically arranged sliding struts 207; both ends of the supporting carriage 2 are respectively provided with a reciprocating assembly;

assembly supporting frames 3, where two assembly supporting frames 3 are symmetrically and fixedly installed at both ends of the supporting carriage 2, and the opposite side surfaces of the two assembly supporting frames 3 are respectively rotatably connected with a rotating seats 305;

an assembly sliding column 4, where both ends of the assembly sliding column are respectively fixedly installed and in transmission connection with two rotating seats 305; both ends of the assembly sliding column 4 are respectively in transmission connection with the reciprocating assembly;

a polishing supporting shaft 5, where the polishing supporting shaft 5 and the assembly sliding columns 4 are in transmission connection, a locking mechanism for loading sandpaper is arranged on the polishing supporting shaft 5, and the sandpaper is attached to the outer wall of the polishing supporting shaft 5 in a surrounding way.

The polishing device for the metal conveyor belt suitable for an automatic conveyor line provided by the application is mainly used for polishing the rust and stains on the surface of the metal conveyor belt. When in use, the pre-prepared sandpaper is wound and attached to the polishing supporting shaft 5, and then the sandpaper is locked and fixed by the locking mechanism on the polishing supporting shaft 5, so that the sandpaper is firmly attached and fixed on the polishing supporting shaft 5 for polishing the metal conveyor belt. The sandpaper is convenient to install and replace, and saves time and labor. The rotating seats 305 rotatably connected to the assembly supporting frames 3 drive the polishing supporting shaft 5 wrapped with sandpaper to rotate through the assembly sliding column 4, so that the sandpaper rubs the surface of the metal conveyor belt, thereby polishing the metal conveyor belt, realizing polishing of the metal conveyor belt, greatly reducing the labor intensity and improving the polishing efficiency. The reciprocating assembly on the supporting carriage 2 drives the assembly sliding column 4 to oscillate in a reciprocating manner, and the rotating polishing supporting shaft 5 is pushed and pulled in a reciprocating manner transversely, so that the polishing supporting shaft 5 is able to synchronously perform reciprocating rubbing to a certain extent when cooperating with sandpaper to perform rotating polishing, further improving the efficiency and effect of polishing the device, and reducing the damage to the metal conveyor belt caused by excessive polishing. The barrier protection assembly arranged on the holding pillar 1 is able to cover the working parts which are not running, and bear and protect the parts for grinding and polishing, thus reducing the damage caused by bumping and further improving the service life of the device.

In an embodiment, the locking mechanism includes a locking bearing groove 503 penetrating through the outer wall of the polishing supporting shaft 5, and clamping grooves 505 are respectively arranged at the upper and lower ends of the locking bearing groove 503. A positioning pillar 506 is fixedly installed in one of the clamping grooves 505, a locking assembly is arranged on the positioning pillar 506, and the locking assembly is detachably connected with an other one of the clamping grooves 505, one end of the sandpaper is clamped between the one of the clamping grooves 505 and the positioning pillar, and an other end of sandpaper is clamped between the locking assembly and the other one of the clamping grooves 505. When in use, one end of the sandpaper is inserted into the locking bearing groove 503, and one end of the sandpaper is clamped in the clamping groove 505 through the positioning pillar 506 for fixation. The other end of the sandpaper extends out of the locking bearing groove 503 and encircles the polishing supporting shaft 5 for one turn, and then is inserted into the locking bearing groove 503 again, and is clamped and fixed in another clamping groove 505 by the locking assembly, so that the sandpaper is fixed.

Furthermore, a supporting block 504 is fixedly connected to the side of the locking bearing groove 503 corresponding to the positioning pillar 506, and the top end of the supporting block 504 is provided with an arc surface, which is convenient for sandpaper to change direction, and at the same time, the fixed sandpaper is smoother without protruding, thus improving the polishing quality.

In an embodiment, the locking assembly includes a threaded supporting shaft 5091 rotatably connected in the locking bearing groove 503, and a plurality of threaded sleeving blocks 509 are threadedly connected on the threaded supporting shaft 5091. The side walls of the threaded sleeving blocks 509 corresponding to the positioning pillar 506 are hinged with a supporting bottom column 508, and the supporting bottom column 508 is hinged with the positioning pillar 506. The other ends of a plurality of threaded sleeving blocks 509 are in transmission connection with locking struts 5095, and the locking struts 5095 are detachably connected with the clamping grooves 505, and sandpaper is clamped between the locking struts 5095 and the clamping grooves 505. A positioning support 507 is fixedly connected to the positioning pillar 506, and the positioning support 507 is hinged with the supporting bottom column 508, so that the angles of the supporting bottom column 508, the positioning support 507 and the threaded sleeving blocks 509 are able to be adjusted, and the distance between the threaded sleeving blocks 509 and the positioning pillar 506 is able to be further adjusted. The other end of the threaded sleeving blocks 509 is hinged with a supporting top column 5093 corresponding to the supporting bottom column 508. The supporting top column 5093 is symmetrically arranged with the supporting bottom column 508, and the end of the supporting top column 5093 away from the threaded sleeving blocks 509 is hinged with a locking support block 5094, so that the distance between the locking support block 5094 and the threaded sleeving blocks 509 is able to be adjusted. A plurality of locking support blocks 5094 are fixedly connected to the same locking strut 5095. When in use, the threaded supporting shaft 5091 is rotated by adjusting side block 5092, so that the threaded sleeving blocks 509 threadedly connected on the threaded supporting shaft 5091 are translated, and the horizontal distance between the threaded sleeving blocks 509 and the positioning support 507 and the locking support block 5094 is changed, and the angles of the supporting top column 5093 and the supporting bottom column 508 are changed. Further, the distance between the locking strut 5095 and the positioning pillar 506 is changed, and finally, the locking strut 5095 clamps and fixes the free edge of sandpaper in the clamping grooves 505, so that the sandpaper is clamped and fixed rapidly, and the sandpaper is attached to the surface of the polishing supporting shaft 5 in a cylindrical shape, which is also convenient for the replacement of sandpaper in the polishing process.

In an embodiment, the both ends of the assembly sliding column 4 are respectively fixedly connected with a limit supports 401, and the limit supports 401 is in transmission connection with the rotating seats 305. A supporting sleeve 404 is rotatably sleeved on the assembly sliding column 4, and the supporting sleeve 404 is in transmission connection with the reciprocating assembly. The end face of the supporting sleeve 404 away from the limit supports 401 is fixedly connected with a rotating clamping block 405, and the end face of the polishing supporting shaft 5 is provided with a rotating clamping groove 502 adapted to the rotating clamping block 405, and the rotating clamping block 405 is inserted into the rotating clamping groove 502. The side wall of the assembly sliding column 4 is fixedly connected with the limit side block 403, and the bottom end of the rotating clamping groove 502 is provided with an assembly sleeving groove 501. The assembly sleeving groove 501 is matched with the limit side block 403, and the limit side block 403 is inserted into the assembly sleeving groove 501. The rotating seats 305 drives the assembly sliding column 4 to rotate through the limit supports 401, the supporting sleeve 404 is rotatably sleeved on the assembly sliding column 4, and the rotating clamping block 405 is fixedly installed on the end face of the supporting sleeve 404 facing the polishing supporting shaft 5. At the same time, the rotating clamping block 405 is inserted the into rotating clamping groove 502 and rotatably connected with the rotating clamping groove 502. When the reciprocating assembly push the supporting sleeve 404 to reciprocate left and right, the assembly sliding column is not affected to drive the rotating polishing supporting shaft 5 to rotate. At the same time, the rotating polishing supporting shaft 5 is pushed and pulled horizontally and reciprocally by the rotating clamping block 405, so that the polishing supporting shaft 5 is able to synchronously carry out reciprocating rubbing to a certain extent when cooperating with sandpaper for rotating polishing, and further improve the efficiency and effect of the device for polishing. The assembly sleeving groove 501 penetrates through the center of the polishing supporting shaft 5, and the assembly sliding column 4 passes through the assembly sleeving groove 501. At the same time, the limit side block 403 on the assembly sliding column 4 is combined with the assembly sleeving groove 501, so that relative rotation between the assembly sliding column 4 and the assembly sleeving groove 501 cannot occur and then the polishing supporting shaft 5 is driven to rotate by the assembly sliding column 4, and the oxidized part of the metal conveyor belt is quickly polished by sandpaper on the surface.

In an embodiment, the reciprocating assembly includes a reciprocating motor 202 fixedly installed in the supporting carriage 2, and the output shaft of the reciprocating motor 202 is in transmission connection with a tooth-uncompleted gear 205, and the tooth-uncompleted gear 205 is in transmission connection with a positioning tooth block 407 fixedly installed on the side wall of the supporting sleeve 404, and the positioning tooth block 407 is sleeved on each of the sliding struts 207 in a sliding way. The outside of assembly sliding column 4 is sleeved with a positioning spring 406, and both ends of the positioning spring 406 are respectively fixedly connected with the limit supports 401 and the supporting sleeve 404. The supporting carriage 2 is provided with a mounting top groove 201, and the reciprocating motor 202 is fixedly installed in the mounting top groove 201. The output end of the reciprocating motor 202 is in transmission connection with a mounting joint shaft 204 rotatably connected in the mounting top groove 201 through a meshing bevel gear set or a worm gear combination, so as to drive a tooth-uncompleted gear 205 in transmission connection with the mounting joint shaft 204 to rotate. The side of the mounting top groove 201 facing the assembly sliding pillar 4 is penetrated with a mounting side groove 203, and the edge of the tooth-uncompleted gear 205 extends out of supporting carriage 2 from the mounting side groove 203 and is engaged with a positioning tooth block 407 fixedly connected outside the supporting sleeve 404. Some section of the edge of the tooth-uncompleted gear 205 has no teeth and is separated from the positioning tooth block 407. When the teeth of the tooth-uncompleted gear 205 mesh with the positioning tooth block 407, rotation of the tooth-uncompleted gear 205 pushes the positioning tooth block 407 to move, so that the supporting sleeve 404 drives the assembly sliding column 4 to swing left and right, and then the polishing supporting shaft 5 is driven to translate by rotating clamping block 405, and at this time, the positioning spring 406 is also deformed by force. However, when the tooth-uncompleted gear 205 corresponds to the smooth section of the positioning tooth block 407, the tooth-uncompleted gear 205 is separated from the positioning tooth block 407, and the positioning tooth block 407 is no longer subjected to the force of the tooth-uncompleted gear 205. At this time, the positioning spring 406 is reset to drive the supporting sleeve 404 to reset. When in use, the tooth-uncompleted gear 205 rotates back and forth, in combination with the positioning spring 406, the supporting sleeve 404 moves back and forth, which drives the polishing supporting shaft 5 to be pulled left and right.

Further, the side wall of supporting carriage 2 is fixedly connected with the sliding struts 207 through the limit supporting block 206, and one end of the positioning tooth block 407 is provided with a positioning sliding hole 408 adapted to the sliding struts 207, and the sliding struts 207 are slidably connected with the positioning sliding hole 408, so as to limit the movement of the positioning slider.

In an embodiment, a driving motor 302 is fixedly installed in each of the assembly supporting frames 3, and the output end of the driving motor 302 is in transmission connection with a driving gear 303, and the driving gear 303 is in transmission connection with the transmission gear 307 sleeved and fixedly connected outside the rotating seats 305. The side wall of the each of the assembly supporting frames 3 is provided with a rotating groove 304, and the outer wall of the rotating seats 305 is provided with a preset groove 306 adapted to the rotating groove 304, and the preset groove 306 is clamped in the rotating groove 304 and rotatably connected with the rotating groove 304. A threaded groove 309 is formed through the rotating seats 305, and the threaded groove 309 is arranged corresponding to the locking hole 402 formed on the limit supports 401, and a bolt is screwed between the threaded groove 309 and the locking hole 402. The each of the assembly supporting frame 3 is provided with a bearing side groove 301, and the driving motor 302 is fixedly installed in the bearing side groove 301 and is in transmission connection with a driving gear 303 rotatably connected in the bearing side groove 301, so as to synchronously drive the transmission gear 307 to rotate, and then the rotating seats 305 drives the mounting sliding column 4 to rotate. The rotating side groove and the preset groove 306 cooperate with each other, so that the rotating supporting carriage 305 is clamped on the assembly supporting frames and only rotate. One end of the rotating seats 305 facing the assembly sliding column 4 is fixedly connected with the mounting clamping block 308. The mounting clamping block 308 is adapted to the limit supports 401.

The limit supports 401 is clamped on the mounting clamping block 308 and positioned in the center, so that the threaded groove 309 is aligned with the locking hole 402, and then connected by bolts, so that the bearing base and the rotating seats 305 are connected into a whole.

In an embodiment, the barrier protection assembly includes a positioning supporting block 107 fixedly connected to one end of the holding pillar 1 facing the supporting carriage 2, and both ends of the positioning supporting block 107 are respectively rotatably connected with a rotating bearing column 1071, and a bearing partition frame 1072 is fixedly connected to the rotating bearing column 1071. The bearing partition frame 1072 is detachably connected with the mounting support frame 102 fixedly installed on both sides of the holding pillar 1. The bearing partition frame 1072 is installed at the bottom end of the holding pillar 1 through the rotating bearing column 1071 and the positioning supporting block 107. When the polishing device for the metal conveyor belt suitable for the automatic conveyor line is not needed to be used, the bearing partition frame 1072 is turned to the lower part of the polishing supporting shaft 5 to play a protective role. When the polishing device for the metal conveyor belt suitable for the automatic conveyor line is used, the bearing partition frame 1072 is turned to the lower part of the holding pillar 1 to be fixed without affecting the use, and at the same time, it plays a role in protecting the user's hand and preventing splashing debris from injuring the hand.

In an embodiment, two sides of the mounting support frame 102 are respectively fixedly connected with a bearing frame 103, and a driving battery 104 for supplying power to the polishing device for the metal conveyor belt suitable for the automatic conveyor line is fixedly installed in the bearing frame 103. The driving battery 104 is used to supply power to the driving motor 302 and the reciprocating motor 202 to realize electric polishing. A holding groove 101 is formed through the holding pillar 1, which is convenient for users to hold, and a switch (not shown in the figure) for controlling the driving motor 302 and the reciprocating motor 202 is also arranged in the holding groove 101, which is convenient for control.

The usage method is as follows.

In the application, the device is manually held by the holding pillar 1 in combination with the holding groove 101, the polishing supporting shaft 5 cooperates with the locking bearing groove 503 to attach and bear the pre-prepared sandpaper, and at the same time, the adjusting side block 5092 is rotated to drive the threaded supporting shaft 5091 to rotate, so that the threaded supporting shaft 5091 drives the threaded sleeving block 509 to move through the threaded structure, and at the same time, the supporting top column 5093 and the supporting top column 5093 are pushed and pulled. The supporting position of the locking support block 5094 is adjusted to make the locking strut 5095 cooperate with the clamping groove 505, so as to lock and clamp the attached sandpaper, so that the sandpaper is attached to the surface of the polishing supporting shaft 5 in a cylindrical shape. At the same time, the driving motor 302 drives the driving gear 303 to rotate, and simultaneously drives the transmission gear 307 to rotate, so that the assembly sliding column 4 is driven to rotate, thus manually holding the device. The polishing supporting shaft 5 cooperates with the sandpaper to quickly polish the oxidized part of the metal conveyor belt, and at the same time, the reciprocating motor 202 drives the mounting joint shaft 204 to rotate, so as to synchronously drive the tooth-uncompleted gears 205 to rotate, so that the two tooth-uncompleted gears 205 push and pull the positioning tooth block 407 left and right, and at the same time, the supporting sleeve 404 cooperates with the rotating clamping block 405 to push and pull the rotating polishing supporting shaft 5 laterally and reciprocally, so that the polishing supporting shaft 5 cooperates with sandpaper to synchronously perform reciprocating rubbing left and right to a certain extent during rotating polishing.

In the description of the present application, it should be noted that the orientation or position relationships indicated by the terms "longitudinal", "transverse", "upper", "lower", "front", "rear", "left", "right", "vertical", "horizontal", "top", "bottom", "inner", "outer" are based on the orientation or position relationships shown in the figures, which are only for the convenience of describing the present application, rather than indicating or implying that the device or elements must be in designated orientation, or configured or operated in designated orientation, so that they shall not be understood as the limitation of this application.

The above-mentioned embodiments only describe the preferred mode of the present application, and do not limit the scope of the present application. Without departing from the design spirit of the present application, all kinds of modifications and improvements made by ordinary technicians in the field to the technical scheme of the present application should fall within the protection scope defined by the claims of the present application.

What is claimed is:

1. A polishing device for a metal conveyor belt suitable for an automatic conveyor line, comprising:
    a holding pillar (1), wherein one end of the holding pillar is fixedly provided with a bearing head (105); and a bottom end of the holding pillar (1) is provided with a barrier protection assembly;
    a supporting carriage (2), wherein the supporting carriage (2) is fixedly connected to the bearing head (105), and symmetrically arranged sliding struts (207) are fixedly connected to both ends of the supporting carriage (2); and the both ends of the supporting carriage (2) are respectively provided with a reciprocating assembly;
    assembly supporting frames (3), wherein two assembly supporting frames (3) are symmetrically and fixedly installed at the both ends of the supporting carriage (2), and opposite side surfaces of the two assembly supporting frames (3) are respectively rotatably connected with a rotating seats (305);
    an assembly sliding column (4), wherein both ends of the assembly sliding column (4) are respectively fixedly installed and in transmission connection with two rotating seats (305); and the both ends of the assembly sliding column (4) are respectively in transmission connection with the reciprocating assembly; and
    a polishing supporting shaft (5), wherein the polishing supporting shaft (5) is in transmission connection with the assembly sliding column (4); the polishing supporting shaft (5) is provided with a locking mechanism for loading sandpaper, and the sandpaper is attached to an outer wall of the polishing supporting shaft (5) in a surrounding way.

2. The polishing device for a metal conveyor belt suitable for an automatic conveyor line according to claim 1, wherein the locking mechanism comprises a locking bearing groove (503) penetrating through the outer wall of the polishing supporting shaft (5), and clamping grooves (505) are respectively arranged at upper and lower ends of the locking bearing groove (503); a positioning pillar (506) is fixedly installed in one of the clamping grooves (505), a locking assembly is arranged on the positioning pillar (506), and the locking assembly is detachably connected with another one of the clamping grooves (505), one end of the sandpaper is clamped between the one of the clamping grooves (505) and the positioning pillar (506), and another end of the sandpaper is clamped between the locking assembly and the other one of the clamping grooves (505).

3. The polishing device for a metal conveyor belt suitable for an automatic conveyor line according to claim 2, wherein the locking assembly comprises a threaded supporting shaft (5091) rotatably connected in the locking bearing groove (503), and a plurality of threaded sleeving blocks (509) are connected to the threaded supporting shaft (5091) in a threaded manner; side walls of the threaded sleeving blocks (509) corresponding to the positioning pillar (506) are hinged with a supporting bottom column (508), and the supporting bottom column (508) is hinged with the positioning pillar (506); other ends of the plurality of threaded sleeving blocks (509) are in transmission connection with a locking strut (5095), and the locking strut is detachably connected with the clamping grooves (505), and the sandpaper is clamped between the locking struts (5095) and the clamping grooves (505).

4. The polishing device for a metal conveyor belt suitable for an automatic conveyor line according to claim 1, wherein both ends of the assembly sliding column (4) are respectively fixedly connected with a limit supports (401), and the limit supports (401) is in transmission connection with the rotating seats (305); a supporting sleeve (404) is rotatably sleeved on the assembly sliding column (4), and the supporting sleeve (404) is in transmission connection with the reciprocating assembly; an end face of the supporting sleeve (404) away from the limit supports (401) is fixedly connected with a rotating clamping block, and an end face of the polishing supporting shaft (5) is provided with a rotating clamping groove (502) adapted to the rotating clamping block (405), and the rotating clamping block (405) is inserted into the rotating clamping groove (502).

5. The polishing device for a metal conveyor belt suitable for an automatic conveyor line according to claim 4, wherein a side wall of the assembly sliding column is fixedly connected with a limit side block (403), a bottom end of the rotating clamping groove (502) is provided with an assembly sleeving groove (501) adapted to the limit side block (403), and the limit side block (403) is inserted into the assembly sleeving groove (501).

6. The polishing device for a metal conveyor belt suitable for an automatic conveyor line according to claim 4, wherein the reciprocating assembly comprises a reciprocating motor (202) fixedly installed in the supporting carriage (2), and an output shaft of the reciprocating motor (202) is in transmission connection with a tooth-uncompleted gear (205), and the tooth-uncompleted gear (205) in transmission connection with a positioning tooth block (407) fixedly installed on a side wall of the supporting sleeve (404), the positioning tooth block (407) is sleeved on each of the sliding struts (207) in a sliding way, a positioning spring is sleeved outside the assembly sliding column (4), and both ends of the positioning spring (406) are respectively fixedly connected with the limit support (401) and the supporting sleeve (404).

7. The polishing device for a metal conveyor belt suitable for an automatic conveyor line according to claim 4, wherein a driving motor (302) is fixedly installed in each of the assembly supporting frames (3), and an output end of the driving motor (302) is in transmission connection with a driving gear (303), and the driving gear (303) is in transmission connection with a transmission gear (307) sleeved and fixedly connected on the rotating seats (305), a side wall of the each of the assembly supporting frames (3) is provided with a rotating groove (304), and an outer wall of the rotating seats (305) is provided with a preset groove (306) adapted to the rotating groove (304), and the preset groove (306) is clamped in rotating groove (304) and connected with the rotating groove (304).

8. The polishing device for a metal conveyor belt suitable for an automatic conveyor line according to claim 1, wherein the barrier protection assembly comprises a positioning supporting block (107) fixedly connected to one end of the holding pillar W facing the supporting carriage (2), and both ends of the positioning supporting block (107) are respectively rotatably connected with a rotating bearing column (1071), the rotating bearing column (1071) is fixedly connected with a bearing partition frame (1072); and the bearing partition frame (1072) is detachably connected with a mounting support frame (102) fixedly installed on both sides of the holding pillar W.

9. The polishing device for a metal conveyor belt suitable for an automatic conveyor line according to claim 8, wherein both sides of the mounting support frame (102) are respectively fixedly connected with a bearing frame (103), and a driving battery (104) for supplying power to the device is fixedly installed in the bearing frame (103).

10. The polishing device for a metal conveyor belt suitable for an automatic conveyor line according to claim 7, wherein the rotating seats (305) is provided with a threaded groove (309), and the threaded groove (309) is arranged corresponding to a locking hole (402) provided on the limit supports (401), and a bolt is mounted between the threaded groove (309) and the locking hole (402) in a threaded way.

* * * * *